(12) United States Patent
Agarwal et al.

(10) Patent No.: US 10,135,680 B2
(45) Date of Patent: Nov. 20, 2018

(54) ASSESSING COMPUTING ENVIRONMENT CHANGES USING SPECIFICATION DOCUMENTS

(71) Applicant: International Business Machines Corporation, Armonk, NY (US)

(72) Inventors: Saurabh Agarwal, Cary, NC (US); Steven P. Barbieri, Research Triangle Park, NC (US); Brad L. Blancett, Raleigh, NC (US); Michael D. Elder, Durham, NC (US); Chad M. Holliday, Holly Springs, NC (US); John A. Page, Morrisville, NC (US); Lucinio Santos-Gomez, Durham, NC (US); John E. Swanke, Terryville, CT (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 14/754,130

(22) Filed: Jun. 29, 2015

(65) Prior Publication Data
US 2016/0380817 A1     Dec. 29, 2016

(51) Int. Cl.
*G06F 15/177*  (2006.01)
*H04L 12/24*   (2006.01)
*G06F 8/00*    (2018.01)
*G06F 15/173*  (2006.01)

(52) U.S. Cl.
CPC ............ *H04L 41/0813* (2013.01); *G06F 8/00* (2013.01); *H04L 41/145* (2013.01)

(58) Field of Classification Search
USPC ....................................................... 709/221
See application file for complete search history.

(56) References Cited

U.S. PATENT DOCUMENTS

| 8,051,106 | B2 | 11/2011 | Bird |
| 8,352,914 | B2 | 1/2013 | Sarkar et al. |
| 8,447,859 | B2 | 5/2013 | Bobak et al. |

(Continued)

OTHER PUBLICATIONS

Fu et al., "Impact propagation and risk assessment of requirement changes for software development projects based on design structure matrix", International Journal of Project Management, vol. 30, Issue 3, Apr. 2012, pp. 363-373.

*Primary Examiner* — Hee Soo Kim
(74) *Attorney, Agent, or Firm* — Maeve Carpenter; Edell, Shapiro & Finnan, LLC (57) ABSTRACT

According to one embodiment of the present invention, a system analyzes an environment specification document that specifies a proposed configuration of a full-stack environment for a computing system and that describes infrastructure, middleware, and application elements. The system correlates the environment specification document with an environment instantiated on the computing system from the environment specification document. The system determines an impact of changes in the proposed configuration on the environment instantiated on the computing system, and configures the computing system in accordance with the proposed configuration based on the determined impact. Embodiments of the present invention further include a method and computer program product for analyzing an environment specification document in substantially the same manners described above.

20 Claims, 7 Drawing Sheets

(56) References Cited

U.S. PATENT DOCUMENTS

2010/0257513 A1* 10/2010 Thirumalai ......... G06F 11/3428
717/134
2013/0060933 A1* 3/2013 Tung ................... G06F 11/3495
709/224

* cited by examiner

ASSESSING COMPUTING ENVIRONMENT CHANGES USING SPECIFICATION DOCUMENTS

BACKGROUND

Present invention embodiments relate to configuring computing environments, and more specifically, to assessing the impact of changes to computing environments described by environment specification documents.

An environment specification document describes one or more elements of a computing environment. A full-stack environment specification document is an environment specification document that describes a full-stack computing environment, including infrastructure (e.g., computing systems, storage volumes, networks, etc.), optional middleware (e.g., database management system, web server, etc.), and one or more applications. A virtual full-stack environment may be created (e.g., on a cloud computing system) from a full-stack environment specification document using orchestration tools (e.g., HEAT, etc.) to configure the virtual architecture and automatic software deployment tools (e.g., IBM UrbanCode Deploy, Chef, etc.) to deploy middleware and applications. Each environment specification document may include other environment specification documents (e.g. to describe components of the environment). Environment specification documents may be versioned, shared, and managed like source code. Any element of a running virtual environment may be updated by changing the document used to create it and applying the changed document to the environment. However, applying changes may adversely impact services provided by the environment. The effect of changes may be difficult to predict because of potentially complex chains of dependencies among environment specification documents, environments created from them, services provided by those environments, and the value of those services.

SUMMARY

According to an embodiment of the present invention, a system analyzes an environment specification document that specifies a proposed configuration of a full-stack environment for a computing system and that describes infrastructure, middleware, and application elements. The system correlates the environment specification document with an environment instantiated on the computing system from the environment specification document. The system determines an impact of changes in the proposed configuration on the environment instantiated on the computing system, and configures the computing system in accordance with the proposed configuration based on the determined impact.

An advantage of the system is to allow users to preview the impact of environment specification changes before the changes are applied to running environments. Furthermore, by leveraging the full-stack environment specification documents used to generate the actual environments (rather than static descriptions), the impact of potential changes can be assessed with an unprecedented level of validity and specificity.

According to a further embodiment, the system may determine the impact of the proposed changes based on dependencies of the instantiated environment, usage patterns within the instantiated environment, and value of transactions performed within the instantiated environment and dependent environments. This embodiment provides the advantage of allowing users to preview the end-to-end impact of the proposed changes from specification documents, through the layers of the environment, to the value of services provided by the environment (e.g., the impact on consumers of the services, the value derived from consumer usage, etc.).

According to another embodiment, the system analyzes results accumulated from instantiations of prior proposed configurations to learn iteratively from the impacts from those prior proposed configurations, and determines the impact of the changes in the proposed configuration based on the accumulated learned impacts from the prior proposed configurations. This embodiment allows the system to improve its impact assessment over time by learning from the results of past changes (e.g., the amount of downtime incurred by various types of changes).

According to a further embodiment of the present invention, the system may provide for editing the environment specification document to include one or more proposed configuration changes to the environment for the computing system. The system dynamically determines an impact for each proposed configuration change to the environment instantiated on the computing system in response to entry of the proposed configuration change within the environment specification document. This embodiment provides the user an opportunity to revert the change in light of the impact.

Embodiments of the present invention further include a method and computer program product for analyzing an environment specification document in substantially the same manners described above.

BRIEF DESCRIPTION OF THE DRAWINGS

Generally, like reference numerals in the various figures are utilized to designate like components.

DETAILED DESCRIPTION

Present invention embodiments relate to configuring computing environments and assessing the impact of changes to the environments. For example, an embodiment may associate an environment specification document with running virtual systems generated from it and transactions performed on those generated systems. The embodiment may track technical dependencies (e.g., which environment specification documents were used to generate which virtual systems, which applications run which virtual systems, etc.), usage patterns (e.g., the roles and numbers of users of a system and the applications running on it, the number of transactions and nature of transactions on a system, etc.), the value of transactions that take place on a system, and the like. The embodiment may determine the impact of applying a modified environment specification document to running systems on the basis of the technical dependencies, usage patterns, and value. In addition, an embodiment of the present invention may accumulate analytical insights dynamically and iteratively over time to tune modeling the impact of changes on running systems and the transactions they support.

During the process of editing an environment specification document, an editor tool may actively monitor a user's changes to the specification and provide a real-time impact assessment and alert the user if the change is deemed severe or risky. This prompt feedback gives the user an opportunity to revert a change before the change is saved and/or applied to an instance of an environment.

In addition, or alternatively, guidance may be provided when a user is ready to provision (apply) an environment specification document (e.g., a previously edited and saved version of the document).

In an example scenario, a company uses an environment specification document that provisions two servers. The first server contains a database that is used to store customer information. The second server is used to host the company's retail sales web application, which uses the database server for customer information. The company's performance team determines that they can increase performance of their web application by adding extra temporary space. An engineer in a joint development and operations (or "DevOps") team, which maintains the environment specification document, adds a 50 GB volume specification to the web application server using a configuration tool. According to an embodiment of the present invention, the engineer may see in the user-interface of the configuration tool that the addition of a volume to the server is a non-destructive change. The engineer may also see that the overall impact severity of the change is low. As a result, the engineer may immediately apply the change to the running environment.

In another example scenario, the company's test team finds a bug in the web application. The test team updates the environment specification document to specify a new version number for the application. An embodiment determines that this update requires the web application to be taken off line, and, because the system will be unavailable during the update, the impact severity is high. As a result, the team may decide to schedule the update at a time that will affect the least number of users.

Figure 1:
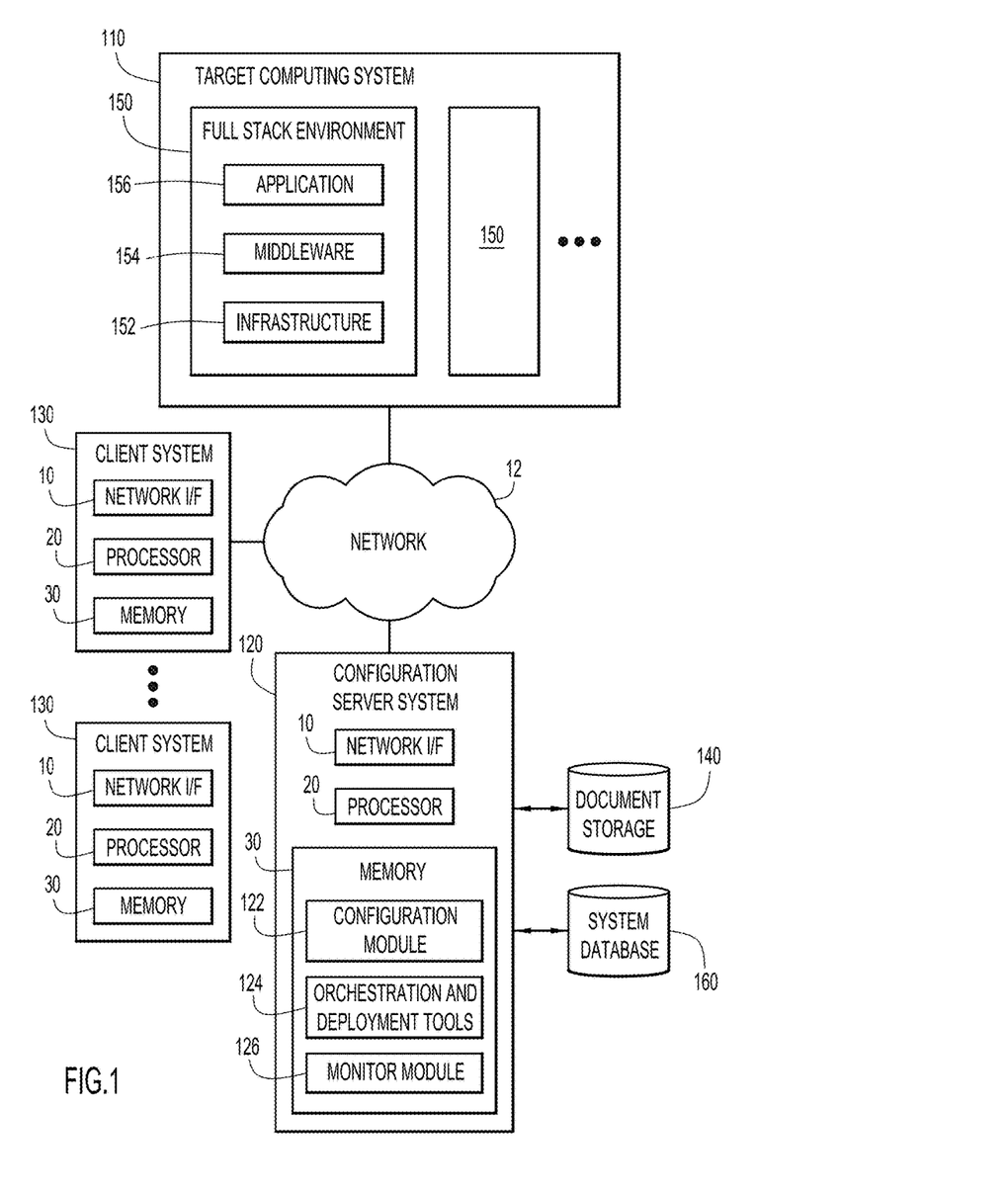
FIG. 1 is a diagrammatic illustration of an example environment for an embodiment of the present invention.

An example environment for present invention embodiments is illustrated in FIG. 1. Specifically, the environment includes one or more target computing systems 110, configuration server systems 120, client or end-user systems 130, document storage systems 140, and databases 160. The systems may be remote from each other and communicate over a network 12. Network 12 may be implemented by any number of any suitable communications media (e.g., wide area network (WAN), local area network (LAN), Internet, intranet, etc.). Alternatively, any number of target computing systems 110, configuration server systems 120, client or end-user systems 130, document storage systems 140, and databases 160 may be local to each other and communicate via any appropriate local communication medium (e.g., local area network (LAN), hardwire, wireless link, intranet, etc.).

Target computing system 110 includes one or more full-stack computing environments 150. Each full-stack computing environment 150 comprises infrastructure 152 (e.g., computing systems, storage, networking, etc.), (optionally) middleware 154 (e.g., database management system, web server, etc.), and one or more applications 156. The infrastructure comprises various elements (e.g., computing systems, storage volumes, networks, etc.), which may be any combination of real and/or virtual elements running on pooled physical resources (e.g., processors, memories, storage devices, network components, etc.) of the target computing system. A target computing system may comprise local and/or remote physical resources.

Configuration server system 120 includes configuration module 122, orchestration and deployment tools 124, and monitor module 126. The configuration module, orchestration and deployment tools, and monitor module may be implemented across plural server systems. Alternatively, the configuration module, orchestration and deployment tools, and monitor module may reside on a client system 130, target computing system 110, or other computer system(s) in communication with the target computing system.

Client systems 130 may enable users (e.g., customers) to communicate with an application 156 (e.g., a retail application) and may enable users (e.g., development/operations personnel) to communicate with configuration module 122 (e.g., via network 12). The client systems may include a client module (e.g., a web browser, custom client application, etc.) presenting any graphical user (e.g., GUI, etc.) or other interface (e.g., command line prompts, menu screens, etc.) to receive commands from users and interact with an application 156, configuration module 122, and/or other modules or services.

Document storage system 140 may be used to store one or more full-stack environment specification documents, each of which may comprise any number of component environment specification documents. Document storage system 140 may be implemented as a version control system or other conventional or custom document storage technology. Database 160 may be implemented using a conventional or other database management system or other data storage system to store information used to assess the impact of applying proposed changes to a full-stack environment 150.

Configuration server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software (e.g., database software, version control software, web browser software, web server software, cloud computing orchestration software, software deployment software, etc.)).

Figure 2:
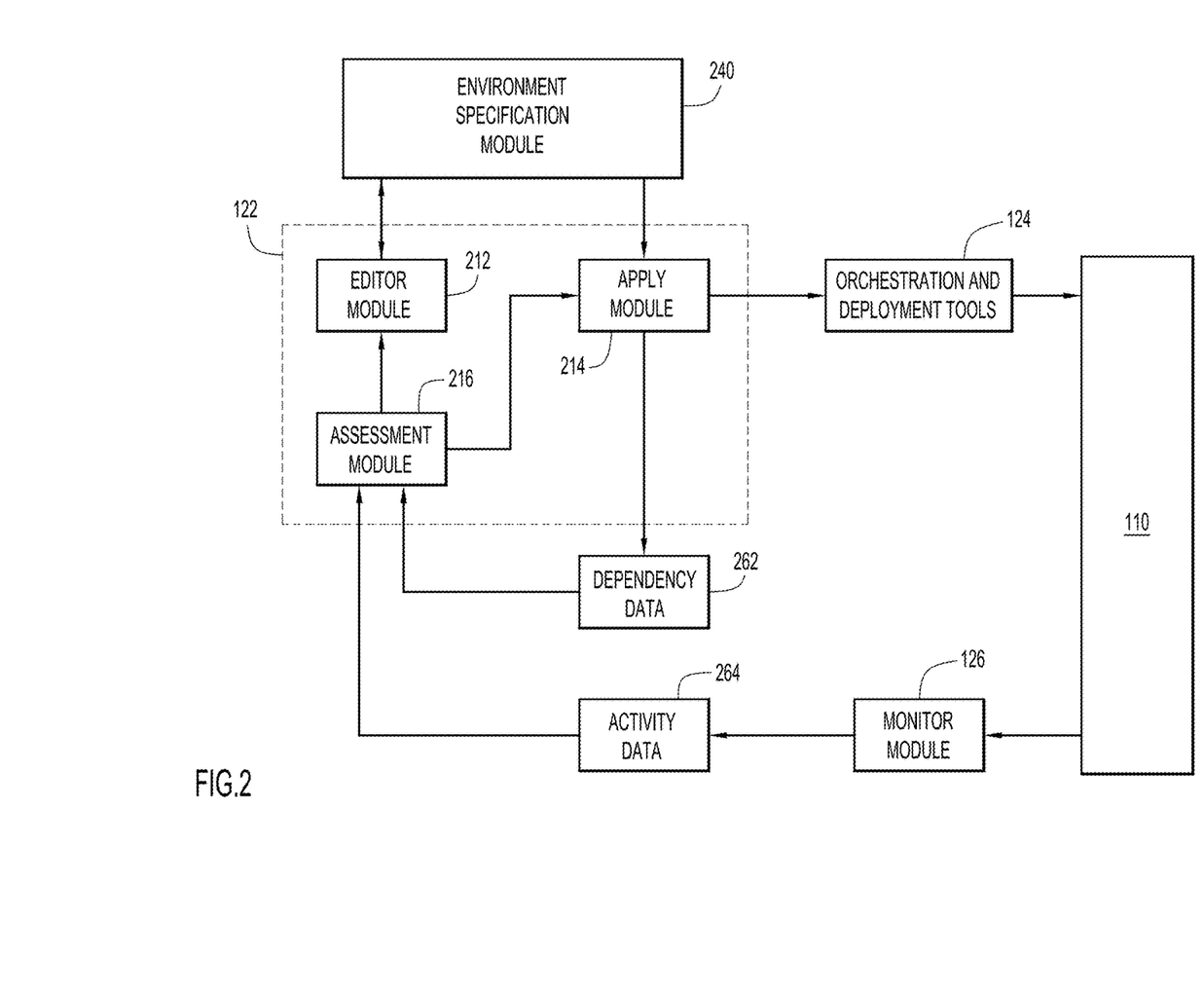
FIG. 2 is a block diagram of an example configuration module according to an embodiment of the present invention.

A block diagram of an example configuration module 122 and associated objects according to an embodiment of the present invention is illustrated in FIG. 2. In particular, configuration module 122 may comprise editor module 212, apply module 214, and assessment module 216, and may interact directly or indirectly with target computing system 110, orchestration and deployment tools 124, monitor module 126, dependency data 262, and activity data 264.

Editor module 212 creates or modifies one or more environment specification documents 240, which the configuration module may store to and retrieve from document storage system 140. Environment specification document 240 may have any conventional or other form. For example, the document may be a Heat Orchestration Template (HOT), CloudFormation template, IBM PureSystems template, or the like. Environment specification document 240 may include (e.g., by reference) one or more other environment specification documents (e.g., specifying elements of the environment).

Apply module 214 creates or updates a full stack environment 150 on the target system from an environment specification document 240 with the use of orchestration and deployment tools 124, which may be any conventional or other tools for infrastructure orchestration and software deployment (e.g., HEAT, IBM UrbanCode Deploy, Chef, etc.). The apply module may record dependency data 262 (e.g., in database 160). The dependency data comprises information associating the created or updated environment with the environment specification document it was created or updated from. For example, the dependency data may comprise a table of records having a document attribute referring to an environment specification document and version number in document storage system 140 and an environment attribute referring a full stack environment created from the document.

Assessment module 216 accesses dependency data 262 and activity data 264 to predict the impact of applying a changed environment specification document to an existing full stack environment 110 (e.g., before an edited document is saved to the document storage system or before a new saved version is applied to the environment). Activity data 264 comprises information about activity of full-stack environment 150 on target computing system 110 (e.g., usage of an application 156). Monitor module may collect this information (e.g., from the target computing system) and store activity data 264 (e.g., in database 160).

The configuration module and associated modules and tools may include one or more other modules or units (e.g., document browser module, etc.) to perform the various functions of present invention embodiments described herein (e.g., accessing environment specification documents, storing environment specification documents, etc.), may be implemented by any combination of any quantity of software and/or hardware modules or units, and may reside within memory 30 of a configuration server system, target computing system, client system, and/or other computing systems or servers for execution by processor 20.

Figure 3:
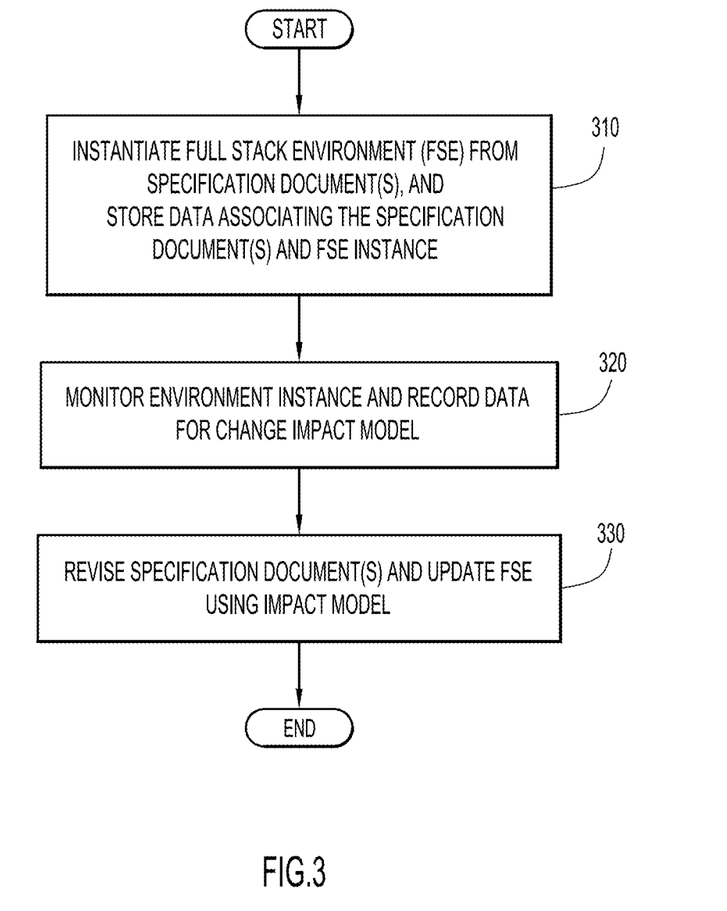
FIG. 3 is a flow diagram illustrating an example manner of deploying a full-stack environment according to an embodiment of the present invention.

An example manner of deploying a full stack environment according to an embodiment of the present invention is illustrated in FIG. 3. Initially, configuration module 122 creates a full-stack environment 150 on a target system 110 based on a full-stack environment specification document at step 310. In addition, the configuration module records information associating the full-stack environment specification document and the resulting full-stack environment.

A user may, for example, select a full-stack environment specification document from a document storage system 140 (e.g., by browsing the document storage system via the configuration module), select a particular target computing system, and elect to create a new environment on the target computing system from the document. Alternatively, the user may create a new full-stack environment specification document or modify an existing one (e.g., via editor module 212), store the new document to document storage system 140, and elect to create an environment from the new or modified document on a particular target computing system. As a result, apply module 214 creates (e.g., using orchestration and deployment tools 124) a new instance of a full-stack environment on the target computing system in accordance with the full-stack environment specification document.

Apply module 214 records information associating the full-stack environment specification document and the resulting full-stack environment. For example, apply module 214 may store dependency data 262 to database 160 upon receiving confirmation from orchestration and deployment tools 124 that the environment was created successfully. In an alternative embodiment, the orchestration and deployment tools 124 may be adapted to store dependency data 262.

Activity of the full stack environment 150 is monitored, and information about this activity (e.g., activity data 264) is recorded (e.g., in database 160) at step 320. Monitoring and recording of the activity may be performed using conventional or other tools (e.g., database logging tools, web application logging tools, cloud system monitoring tools, etc.) internal and/or external to the target computing system and the full-stack environment. Monitor module 126 may access (e.g., asynchronously at regular intervals, in real-time, on-demand by assessment module 216, etc.) the recorded activity (e.g., database(s) used by application(s) 156, database logs, web server logs, web application logs, cloud monitoring records, etc.) to form and store activity data 264 to be used by assessment module 216.

The monitored activity may include changes or other events affecting environments and the effects of those events on the environments. The resulting data may be used (e.g., by monitor module 126 and assessment module 216) to improve modeling of the effects of potential changes. Accordingly, the system may learn iteratively from results accumulated over time for a given environment specification type, improving its analysis. For example, if a change in an environment specification would result in a change to a running environment (e.g., a change in the operating system version of a virtual instance) that would render the system unavailable, the assessment module may estimate the amount of time the system is expected to be unavailable based upon data from prior changes that resulted in the system being unavailable. This estimate may become more accurate over time as the monitor module gathers information from repeated down-time-related events.

At step 330, the full-stack environment specification document (or component thereof) may be revised, and the revision may be applied to a full-stack environment 150 created from a previous version of the document. In the course of determining whether and how to revise a specification document or apply a revised specification document, the impact of proposed changes may be assessed based on the stored information associating specification documents with the environments instantiated from them and the information about the activity within each environment.

Figure 4:
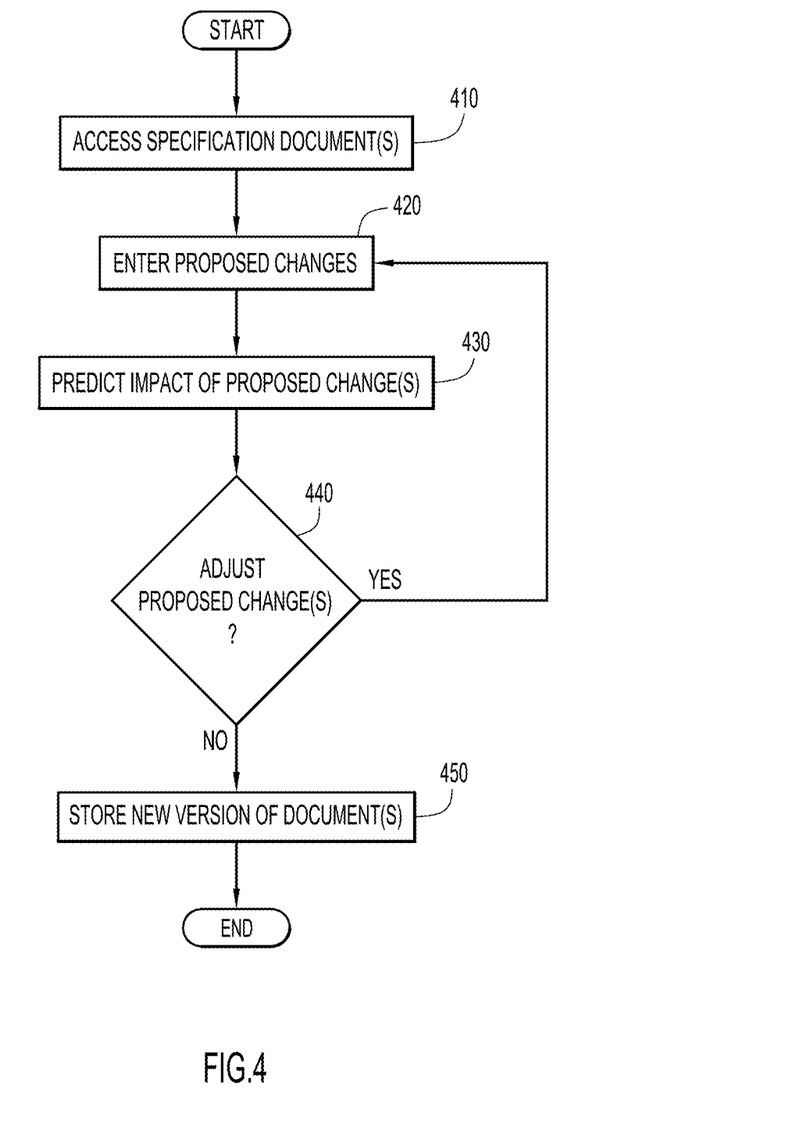
FIG. 4 is a flow diagram illustrating an example manner of revising an environment specification document according to an embodiment of the present invention.

An example manner of revising an environment specification document according to an embodiment of the present invention is illustrated in FIG. 4. Initially, configuration module 122 accesses an environment specification document 240 at step 410. For example, a user may select an environment specification document 240 from document storage system 142 via the configuration module. Proposed changes to the environment specification document are entered at step 420. For example, a user may enter proposed changes to a copy of the environment specification document using editor module 212.

Assessment module 216 predicts the impact of applying the proposed changes at step 430. For example, the assessment module may automatically determine or update the predicted impact in real-time in response to the user making changes to the environment specification document in the editor.

The assessment module may use dependency data 262 to determine which environments were created from the specification document and which applications running in those environments would be affected. If the environment specification document includes one or more other environment specification documents, the assessment module may determine dependencies among the documents, and the relation between those documents and elements of environments created from them, by analyzing the documents using conventional or other techniques (e.g., by identifying "include" statements within the documents to map out hierarchical structure of the specification).

The assessment module may take into account whether updates to resources in a running environment will happen in a destructive or non-destructive manner. A destructive change to a resource is a change that, when applied (e.g., by the orchestration engine), causes the resource to be deleted and a new resource created. All data relating to the existing resource will be lost. A non-destructive change can be made to an existing resource in place. For example, consider an environment specification document that describes one server resource. Adding a volume to the server resource would be a non-destructive change. The existing server resource remains intact and will have a newly mounted volume. But, changing the image identifier for the server resource is a destructive change and will cause the existing server resource to be deleted and a new one created.

In addition, the assessment module may estimate the severity of the impact using a model based on activity data 264. For example, a small change that affects thousands of users may be considered more severe than a large change that only affects a few users. The severity of the impact may depend on several factors including: whether changes are destructive or non-destructive, the number of environments affected, the applications and processes running on the affected environments, the number of users actively using an affected environment, the importance of data on affected resources, the criticality of the affected resources and usage, and security implications. In an example embodiment, the assessment module may cross-reference applications that would be taken offline for a period of time with activity data indicating the usage of the application to determine one or more impact metrics. For example, the embodiment may determine the expected number of users affected, number of transactions affected, loss in gross revenue, or the like that would result from taking a retail sales application offline for the amount of time historically required for such changes. An embodiment that estimates the severity of the impact based on activity information for the environment has the advantage of providing a user (e.g., a middleware developer), who may lack direct knowledge of the operation of the environment, with an assessment of the end-to-end impact of a proposed change.

At step 440, a determination is made whether to adjust the proposed changes based on the predicted impact. If the result of the determination is to adjust the proposed changes, processing returns to step 420. Otherwise, processing proceeds to step 450. At step 450, the revised environment specification document(s) 240 may be saved. For example, a new version of the document(s) may be stored in document storage system 240.

An embodiment in which the assessment module automatically provides an impact assessment in response to changes entered in the editor has the advantage of facilitating revisions to the document, since the user may preview the impact of a potential change to an environment specification while that change is being made and before the changed document is saved. For example, a user may preview the impact of what-if scenarios represented by changes to the document since the document was last saved. The user may receive guidance to help determine whether the proposed change is "safe" (e.g., has low impact risk).

Figure 5:
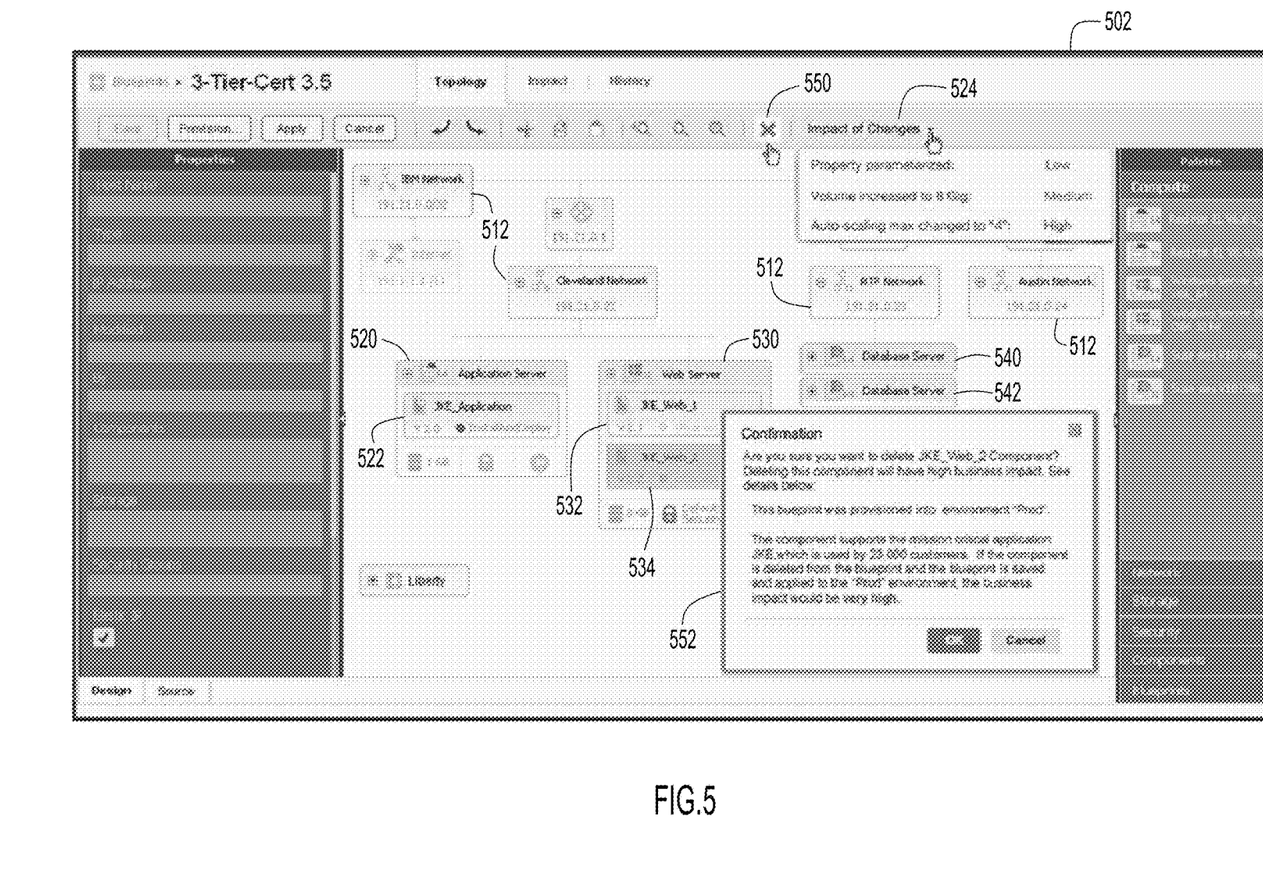
FIG. 5 is an illustration of an example user interface indicating a predicted impact of a proposed change to an environment specification document according to an embodiment of the present invention.

An illustration of an example user interface indicating a predicted impact of a proposed change to an environment specification document according to an embodiment of the present invention is illustrated in FIG. 5. In particular, an environment document ("3-Tier-Cert 3.5") has been loaded into an editor via user interface 502. The user interface provides a graphical depiction of the topology of an environment described by the document. The environment includes networks 512 (e.g., Cleveland Network, RTP Network, Austin Network, etc.). The Cleveland network includes application server 520, running application 522, and Web Server 530 including web modules 532 and 534. The RTP network includes database servers 540 and 542.

The user proposes deleting web module 534 (e.g., by clicking on the module's node in the graph and selecting delete button 550). In response, the user is advised on the impact of the change, if it were to be saved and subsequently applied to the environment created from the original document.

In particular, the configuration module determines an impact of the proposed change and provides guidance by displaying confirmation dialog box 552. The dialog box informs the user that the environment specification document (the "blueprint") was used to create an environment ("Prod"); the selected component supports a mission critical application ("JKE") used by 23,000 customers; and the assessed impact severity of saving the change and subsequently applying the changed document to the "Prod" environment would be "high." This severity assessment may be color coded, expressed numerically, or in any other manner. The user may then cancel or accept the proposed change via the dialog box. In addition, the user interface may allow the user to display a list of any changes to the document (e.g., changes up to the last save operation applied to the document). The list may indicate the severity of the impact (e.g., "Low", "Medium", "High", etc.) from the changes, and/or whether the changes are destructive or non-destructive.

Figure 6:
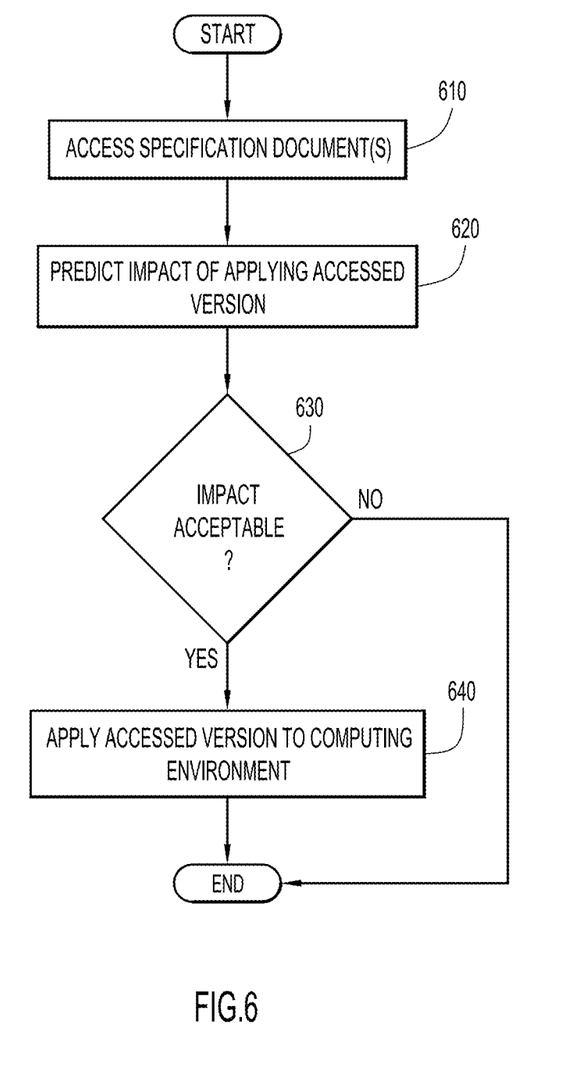
FIG. 6 is a flow diagram illustrating an example manner of applying a revised environment specification document according to an embodiment of the present invention.

An example manner of applying a revised environment specification document according to an embodiment of the present invention is illustrated in FIG. 6. A user may access a revised environment specification document 240 at step 610. For example, a user may select from document storage system 140 a version of an environment specification document 240 containing modifications with respect to another version of the document that was used to create one or more existing environments. At step 620, assessment module 216 predicts the impact of applying the modified environment specification document to one or more existing environments (e.g., environments created or updated from another version of the document). At step 630, a determination is made as to whether the predicted impact of applying the modified document to one or more existing environments is acceptable. If the predicted impact is acceptable, apply module 214 may apply (e.g., via orchestration and deployment tools 124) the modified document to one or more existing environments at step 640. Accordingly, a user may obtain the results of an impact analysis after changes to an environment specification document have been saved, but before they are provisioned (applied to an environment).

Figure 7:
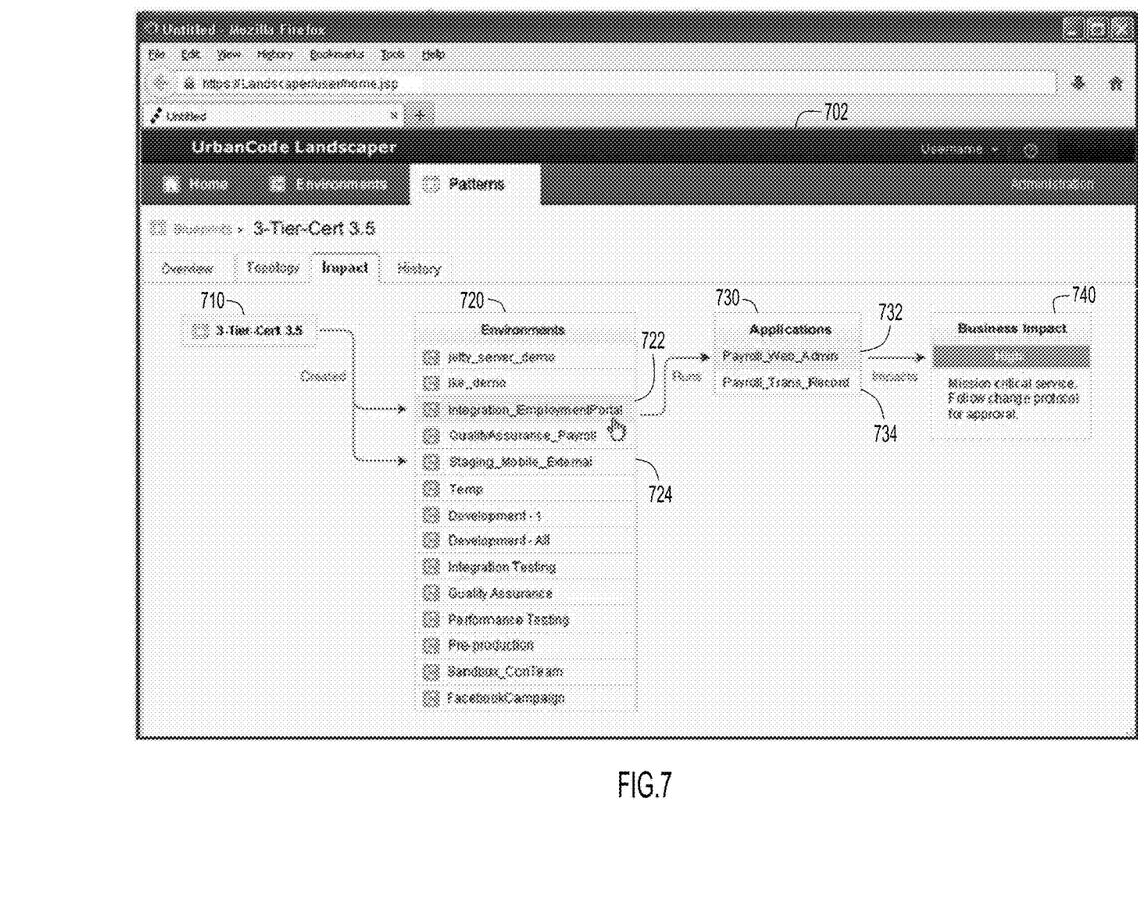
FIG. 7 is an illustration of an example user interface indicating a predicted impact of applying a revised environment specification document according to an embodiment of the present invention.

An example user interface indicating a predicted impact of applying a revised environment specification document according to an embodiment of the present invention is illustrated in FIG. 7. User interface 702 provides a graphical display depicting the relationships between an environment specification document 240, environments 150 created from it, applications 156 running within those environments, and the impact (e.g., the usage or criticality of those applications). The user may elect to view chains of dependencies that include selected items from the environment list and application list to filter the displayed chains of dependencies. In particular, the display includes a user-selected full-stack environment specification document 710 ("3-Tier-Cert 3.5"), an environment list 720, an application list 730, and an assessment of the impact 740. The display indicates the following dependencies: environment specification document 710 was used to create running full-stack environments 722 ("Integration_EmploymentPortal") and 724 (Staging_Mobile_External"), environment 722 runs applications 732 ("Payroll_Web_Admin") and 734 ("Payroll_Trans_Record"), and the impact 740 of a potential change affecting application 732. The impact is designated "High" because, e.g., the assessment module has identified application 732 as a mission critical service.

It will be appreciated that the embodiments described above and illustrated in the drawings represent only a few of the many ways of implementing embodiments for assessing computing environment changes using specification documents.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for assessing computing environment changes using specification documents of any type for any type of computing environment and applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of configuring a computing system comprising:
    analyzing an environment specification document specifying a proposed configuration with changes to a full-stack environment for the computing system and describing an infrastructure, middleware, and application elements;
    correlating the environment specification document with an environment instantiated on the computing system from the environment specification document prior to the changes;
    monitoring activity of the environment instantiated on the computing system;
    determining an impact of the changes in the proposed configuration on the environment instantiated on the computing system prior to implementing the changes, wherein the changes include rendering an application unavailable and the impact is based on usage information pertaining to the application obtained during the monitoring; and
    configuring the computing system in accordance with the proposed configuration based on the determined impact.

2. The method of claim 1, wherein the environment specification document includes another environment specification document.

3. The method of claim 1, wherein the determining an impact of the changes in the proposed configuration comprises:
    determining an impact of the changes in the proposed configuration on the instantiated environment based on one or more from a group of dependencies of the instantiated environment, usage patterns within the instantiated environment, and value of transactions performed within the instantiated environment and dependent environments.

4. The method of claim 1, wherein analyzing the environment specification document comprises:
    editing the environment specification document to include one or more proposed configuration changes to the environment for the computing system;
    wherein determining an impact of the changes in the proposed configuration comprises:
        dynamically determining an impact for each proposed configuration change to the environment instantiated on the computing system in response to entry of that proposed configuration change within the environment specification document.

5. The method of claim 1, wherein determining an impact of the changes in the proposed configuration comprises:
    determining a severity of the impact of the changes in the proposed configuration.

6. The method of claim 1, wherein determining an impact of the changes in the proposed configuration comprises:
    analyzing results accumulated from instantiations of prior proposed configurations to learn iteratively from the impacts from those prior proposed configurations; and
    determining the impact of the changes in the proposed configuration based on the accumulated learned impacts from the prior proposed configurations.

7. The method of claim 1, wherein correlating the environment specification document with an environment instantiated on the computing system from the environment specification document comprises accessing information associating the environment specification document and the environment recorded automatically in response to instantiating the environment.

8. The method of claim 1, wherein correlating the environment specification document with an environment instantiated on the computing system from the environment specification document comprises determining dependencies among a plurality of other environment specification documents included in the environment specification document.

9. A system for configuring a computing system comprising:
    at least one processor configured to:
        analyze an environment specification document specifying a proposed configuration with changes to a full-stack environment for the computing system and describing an infrastructure, middleware, and application elements;
        correlate the environment specification document with an environment instantiated on the computing system from the environment specification document prior to the changes;
        monitor activity of the environment instantiated on the computing system;
        determine an impact of the changes in the proposed configuration on the environment instantiated on the computing system prior to implementing the changes, wherein the changes include rendering an application unavailable and the impact is based on usage information pertaining to the application obtained during the monitoring; and
        configure the computing system in accordance with the proposed configuration based on the determined impact.

10. The system of claim 9, wherein the environment specification document includes another environment specification document.

11. The system of claim 9, wherein the determining an impact of the changes in the proposed configuration comprises:
    determining an impact of the changes in the proposed configuration on the instantiated environment based on one or more from a group of dependencies of the instantiated environment, usage patterns within the instantiated environment, and value of transactions performed within the instantiated environment and dependent environments.

12. The system of claim 9, wherein analyzing the environment specification document comprises:
editing the environment specification document to include one or more proposed configuration changes to the environment for the computing system;
wherein determining an impact of the changes in the proposed configuration comprises:
dynamically determining an impact for each proposed configuration change to the environment instantiated on the computing system in response to entry of that proposed configuration change within the environment specification document.

13. The system of claim 9, wherein determining an impact of the changes in the proposed configuration comprises:
determining a severity of the impact of the changes in the proposed configuration.

14. The system of claim 9, wherein determining an impact of the changes in the proposed configuration comprises:
analyzing results accumulated from instantiations of prior proposed configurations to learn iteratively from the impacts from those prior proposed configurations; and
determining the impact of the changes in the proposed configuration based on the accumulated learned impacts from the prior proposed configurations.

15. A computer program product for configuring a computing system comprising:
a computer readable storage medium having computer readable program code embodied therewith for execution on a processing system, the computer readable program code comprising computer readable program code configured to:
analyze an environment specification document specifying a proposed configuration with changes to a full-stack environment for the computing system and describing an infrastructure, middleware, and application elements;
correlate the environment specification document with an environment instantiated on the computing system from the environment specification document prior to the changes;
monitor activity of the environment instantiated on the computing system;
determine an impact of the changes in the proposed configuration on the environment instantiated on the computing system prior to implementing the changes, wherein the changes include rendering an application unavailable and the impact is based on usage information pertaining to the application obtained during the monitoring; and
configure the computing system in accordance with the proposed configuration based on the determined impact.

16. The computer program product of claim 15, wherein the environment specification document includes another environment specification document.

17. The computer program product of claim 15, wherein the determining an impact of the changes in the proposed configuration comprises:
determining an impact of the changes in the proposed configuration on the instantiated environment based on one or more from a group of dependencies of the instantiated environment, usage patterns within the instantiated environment, and value of transactions performed within the instantiated environment and dependent environments.

18. The computer program product of claim 15, wherein analyzing the environment specification document comprises:
editing the environment specification document to include one or more proposed configuration changes to the environment for the computing system;
wherein determining an impact of the changes in the proposed configuration comprises:
dynamically determining an impact for each proposed configuration change to the environment instantiated on the computing system in response to entry of that proposed configuration change within the environment specification document.

19. The computer program product of claim 15, wherein determining an impact of the changes in the proposed configuration comprises:
determining a severity of the impact of the changes in the proposed configuration.

20. The computer program product of claim 15, wherein determining an impact of the changes in the proposed configuration comprises:
analyzing results accumulated from instantiations of prior proposed configurations to learn iteratively from the impacts from those prior proposed configurations; and
determining the impact of the changes in the proposed configuration based on the accumulated learned impacts from the prior proposed configurations.

* * * * *